No. 879,604. PATENTED FEB. 18, 1908.
J. WAWRZINSKI.
BEER TAP.
APPLICATION FILED APR. 12, 1907.
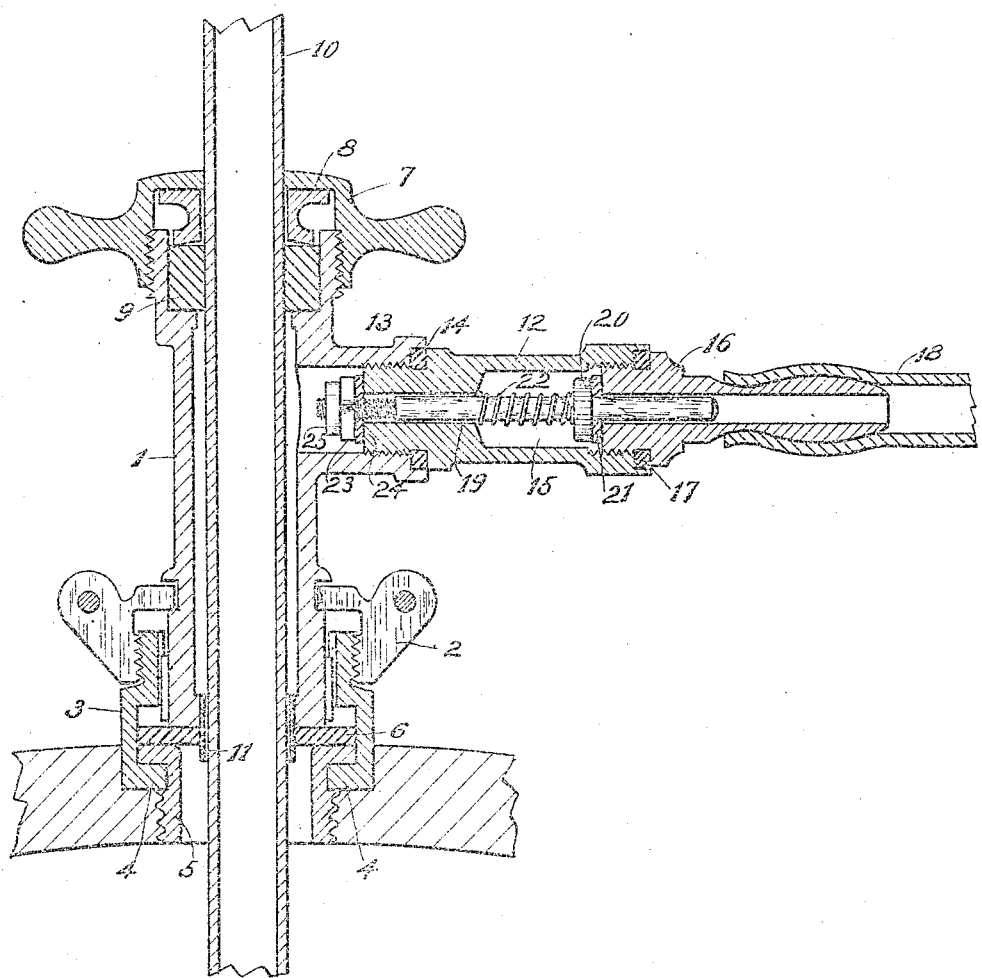
WITNESSES
INVENTOR
John Wawrzinski,
Benedict, Morsell & Caldwell
ATTORNEYS

UNITED STATES PATENT OFFICE.

JOHN WAWRZINSKI, OF OSHKOSH, WISCONSIN.

BEER-TAP.

No. 879,604.

Specification of Letters Patent.

Patented Feb. 18, 1908.

Application filed April 12, 1907. Serial No. 367,818.

*To all whom it may concern:*

Be it known that I, JOHN WAWRZINSKI, residing in Oshkosh, in the county of Winnebago and State of Wisconsin, have invented new and useful Improvements in Beer-Taps, of which the following is a description, reference being had to the accompanying drawings, which are a part of this specification.

This invention has for its object to provide a beer tap with a back pressure valve of novel construction which will effectively prevent the pressure from the beer keg entering the communication leading to the beer tap from the air pressure reservoir.

Another object of this invention is to provide such an improved back pressure valve as an attachment for connection to beer taps of ordinary construction.

Another object of this invention is to provide a back pressure check valve for beer taps which will have a double seating effect.

Heretofore beer taps have usually been provided with a rubber lip valve to prevent back pressure from the beer keg forcing the beer foam through the connection leading to the beer tap from the pressure reservoir, and as these rubber lip valves are prevented from entirely closing if foreign matter lodges between the lips thereof, and as they are frequently prevented from closing properly through other causes, with the result that the beer foam is forced therethrough and into the connections and the air reservoir where it becomes foul and affects the beer in the keg by the contaminated air passing therefrom to the keg, it is the object of this invention to provide a more efficient valve which will positively prevent the passage of liquid into the pipe connections.

With the above and other objects in view the invention consists in the beer tap herein claimed, its parts and combinations of parts and all equivalents.

Referring to the accompanying drawings forming a part hereof, the figure represents a central sectional view of a beer tap constructed in accordance with this invention.

In these drawings 1 indicates a tubular casing of ordinary construction which is provided with a divided swiveled nut 2 engaging a clamping head 3 having inwardly extending lugs 4 to grip the flanges of a bung bushing 5 in the usual manner, there being a gasket 6 between the end of the bung bushing and the end of the casing. A packing cap 7 is threaded to the upper end of the casing and is adapted to force a bushing 8 against a packing ring 9 so as to effectively close the space between the casing and a tube 10 which passes centrally therethrough and prevent the escape of pressure, the lower end of the casing being provided with a short sleeve 11 surrounding the tube at a distance therefrom to prevent the gasket 6 being pressed into contact with the tube, thereby allowing free communication between the interior of the casing 1 and the beer keg.

The novelty of this invention resides in the construction of the valve and its parts between the casing 1 and the pressure reservoir or other means for supplying pressure to the keg for forcing the beer through the tube 10. A valve casing 12 is threaded in the pipe connection 13 of the casing 1 instead of the usual nipple carrying a lip valve and is provided with packing 14 to tightly seal the connection. The valve casing 12 is recessed at one end to provide a valve chamber 15 which is closed by a nipple 16 threading into the end thereof with a packing 17 closing the connection, the nipple being connected with the rubber tube 18 or other connecting means leading from the pressure reservoir. A valve stem 19 passes through the bore of the valve casing 12 and into the bore of the nipple 16 and has an enlarged head or annular flange forming a valve 20 within the valve chamber 15 which is adapted to seat upon the end of the nipple 16 with a gasket 21 therebetween. This valve is normally held seated by means of a coil spring 22 surrounding the valve stem within the valve chamber 15 and bearing at one end against the end of the valve chamber and at the other end against the valve head. The inner end of the valve stem 19 is screw threaded and a nut 23 is threaded thereon to form a valve seating against the end of the valve casing 12 with a gasket 24 therebetween, there being a jam nut 25 also threaded on the end of the valve stem to lock the valve nut 23 in its adjustments on the valve stem so that both valves 20 and 23 will seat at the same time.

In assembling the valve the valve stem with the spring thereon is placed in position in the valve casing and then the nipple is tightly screwed into place, the spring holding the valve 20 seated. Now the valve nut 23 is threaded on the projecting end of the valve stem until it seats against the end of the valve casing, when the jam nut 25 is turned into engagement therewith to lock it in its adjustment. Thus both valves 20 and 23 are caused to seat at the same time and a double assurance is provided that there will be no passage of air or foam from the casing 1 into the tubing 18 or the reservoir to which it is connected. The double valve opens freely to permit the compressed air to pass from the reservoir to the keg, but is quickly seated when the pressure in the keg is equal to or greater than the pressure in the reservoir, as when the keg is first opened.

It is obvious that the valve construction of this invention may constitute a part of the beer tap proper or it may be in the form of an attachment to be connected with beer taps now in general use.

What I claim as my invention is:

1. A beer tap, comprising a casing, a valve casing connected thereto and containing a valve chamber, a nipple closing the valve chamber, a valve stem slidable in the valve casing, a check valve on the valve stem seating on the nipple, a spring for holding the valve seated, and a nut threaded on the end of the valve stem and seating on the end of the valve casing to form a second check valve for closing the passage between the casing and the nipple.

2. In a beer tap, a back pressure valve comprising a valve casing containing a valve chamber, a nipple closing the valve chamber, a valve stem loosely mounted in the bore of the valve casing and the nipple, a head on the valve stem in the valve chamber for seating against the end of the nipple as a check valve, a spring surrounding the valve stem and bearing on the valve head and on the end of the valve chamber, and a nut threaded on the end of the valve stem and seating on the end of the valve casing to constitute a second check valve for preventing the passage of back pressure from the beer tap.

3. An attachment for beer taps, comprising a valve casing adapted to be threaded into the casing of a beer tap, a nipple threading into the valve casing and closing a valve chamber within the valve casing, a valve stem loosely mounted in the bore of the valve casing and the nipple, a valve head on the valve stem seating on the end of the nipple as a check valve, a spring surrounding the valve stem and bearing on the valve head and on the end of the valve chamber, a nut threaded on the end of the valve stem and seating on the end of the valve casing as a check valve, and a jam nut threaded on the valve stem for locking the said nut in its adjustments.

4. A beer tap, comprising a casing having means for connecting with a bung bushing and a slidable tube for communicating with the interior of the keg with packing between the casing and the tube, a valve casing threaded to said casing, a jacket closing the connection therebetween, a nipple threaded in the end of the valve casing, a gasket closing the connection therebetween, a valve stem loosely mounted in the bore of the valve casing and in the bore of the nipple, a valve head on the valve stem located in a valve chamber of the valve casing, a gasket on the valve stem forming a face for the valve head seating against the end of the nipple as a check valve, a coil spring surrounding the valve stem and bearing on the valve head and on the end of the valve chamber, a nut threaded on the end of the valve stem, a gasket on the valve stem forming a face for the nut to seat against the end of the valve casing and constituting a second check valve, and a jam nut threaded on the end of the valve stem for locking said nut in its adjustments.

In testimony whereof, I affix my signature, in presence of two witnesses.

JOHN WAWRZINSKI.

Witnesses:
W. F. GRUENEWALD,
CHRIS PEDERSEN